Feb. 23, 1926.   1,574,301

A. F. MASURY

FLEXIBLE COUPLING FOR SHAFTING

Filed April 19, 1924

INVENTOR
Alfred F. Masury
BY
Redding Greeley O'Shea Campbell
ATTORNEYS.

Patented Feb. 23, 1926.

1,574,301

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

FLEXIBLE COUPLING FOR SHAFTING.

Application filed April 19, 1924. Serial No. 707,547.

*To all whom it may concern:*

Be it known that I, ALFRED F. MASURY, a citizen of the United States, residing in the borough of Manhattan, of the city of New York, in the State of New York, have invented certain new and useful Improvements in Flexible Couplings for Shafting, of which the following is a specification, reference being had to the accompanying drawings, forming a part hereof.

This invention relates to universal joints of the kind in which the driving torque is transmitted from the driving member to the driven member through re-enforced fabric material. It is an object of the present invention to provide a universal joint of this nature which is of simple and inexpensive construction, easy to assemble, flexible in character so as to accomodate the driving and driven members and in which the driving torque is transmitted by elements which extend along straight lines coincident with the lines of force of the driving torque. More particularly, the improvements relate to a joint which is characterized by the connection of the driving and driven members to the disc on different radii so that the torque arms are of varying lengths. The cords transmitting the torque from one member to another are laid in the fabric tangential to the arc of movement of the shorter torque arms. An illustrated embodiment of the invention wherein the foregoing object is attained will be described in greater particularity in connection with the accompanying drawing in which:

Figure 1:
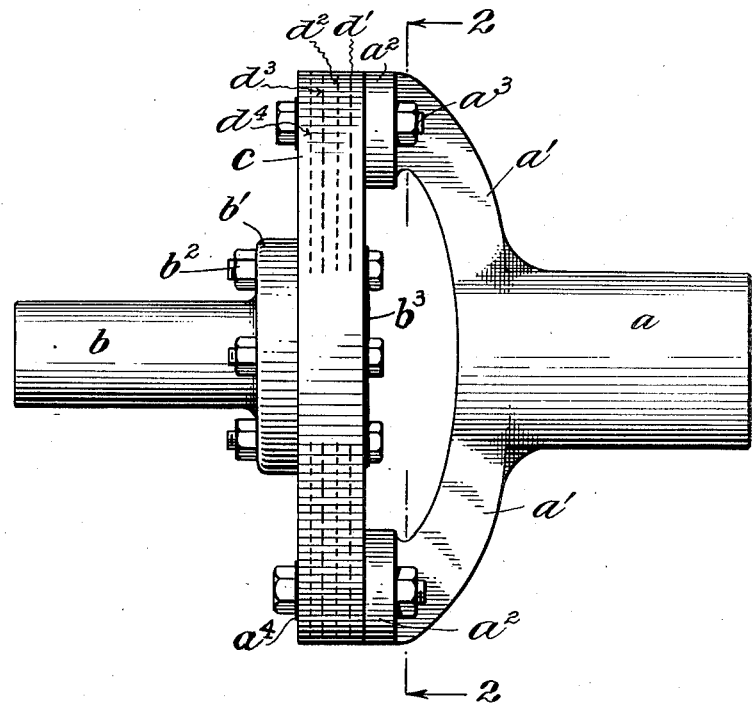
Figure 1 is a view in side elevation of a joint constructed in accordance with the invention.
Figure 2:
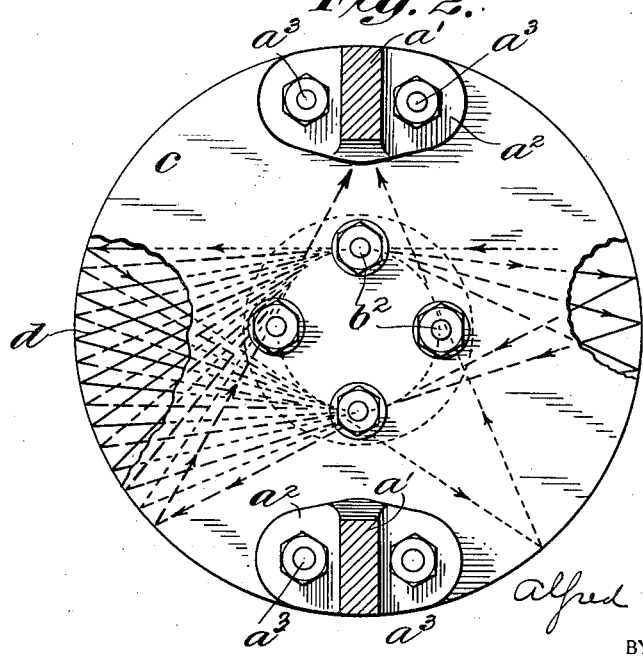
Figure 2 is a view taken in the plane indicated by the line 2—2 in Figure 1 and looking in the direction of the arrows.

It will be assumed for the purpose of this description that the universal joint according to the present invention is to be interposed between a pair of shafts, one of which is the driving shaft and the other of which is the driven shaft with provision for universal movement whereby the two shafts need not be in exact alignment. While the universal joint according to the present invention is equally applicable irrespective of which shaft is the driving shaft and which is the driven shaft, it will be assumed that the hub $a$ (Figure 1) is adapted to be secured in any convenient manner upon the end of a drive shaft from which driving torque is to be transmitted to the driven shaft $b$. Hub $a$ is provided with a pair of diametrically disposed arms $a'$, $a'$ terminating at their ends in flanges $a^2$ disposed in a plane transverse to the axis of the hub. While only two arms have been shown, it will be apparent that any number of arms might be carried with the shaft with satisfactory results. The approximate end of shaft $b$ carries a coupling plate $b'$. Secured to the plate $b'$ at its central portion and to the flanges $a^2$, $a^2$ near its periphery is a flexible disc $c$ of fabricated material re-enforced by tension cords coincident with the lines of force set up in the disc during the transmission of driving stresses between the shafts, the arms $a'$ on the one hand and the coupling plate $b'$ on the other serving as torque arms for the transmission of the driving forces between the respective shafts. The connections with the disc may take any convenient form but it is preferred to secure the central portion of the disc to the plate $b'$ by means of an annular series of bolts $b^2$ and to secure the perimeter of the disc to the diametrically disposed flanges $a^2$ by means of bolts $a^3$. The heads of the bolts may seat against washers or the like on the opposite sides of the disc such as are shown at $a^4$ in Figure 1 whereby the disc is securely clamped therebetween and the strain is distributed somewhat over a greater extent of the disc to minimize the possibilities of the holes in the fabric wearing or tearing. In lieu of washers for the heads of the bolts $b^2$, a ring or plate $b^3$ may be interposed between the heads of the bolts $b^2$ and the fabric disc.

By connecting one shaft to the center of the disc and the other shaft to the perimeter of the disc a connection may be provided which will permit maximum angularity between the shaft and at the same time transmit the driving torque with facility. It has been found that the lines of force set up in the disc when driving torque is transmitted through the disc between torque arms differing in length are disposed tangentially to the arc of movement of the shorter torque arm. In order to re-enforce the disc in the direction of greatest tension, it is proposed to incorporate therein a plurality of cords *d* disposed in the paths of the lines of force and extending from one edge of the disc to the other. To meet manufacturing requirements the tension cord may be continuous as indicated clearly in the drawings. In the preferred embodiment several series of cords are shown, say $d'$, $d^2$, $d^3$ and $d^4$, certain of the cords being wound to the right hand and others being wound to the left hand, the right hand winding being represented by long dashes and the left hand winding being represented by short dashes in the drawings. As a carrier for the cords they may be embedded in rubber or other suitable material to form the disc *c*.

Various changes may be made in the arrangement and disposition of the coupling means carried with the respective shaft ends as well as in the composition and re-enforcement of the disc without departing from the spirit and scope of the invention and no limitation is intended except as indicated in the appended claims.

What I claim is:—

1. In combination with driving and driven shafts, torque arms of different lengths carried with the respective shafts, a disc operatively connected with the torque arms, and tension cords embedded in the disc and disposed in the plane of the disc and tangentially to the arc of movement of the shorter torque arm.

2. In combination with driving and driven shafts, a disc of flexible non-metallic material, arms formed on one of the shafts, means to connect the extremities of the arms with the disc, a coupling plate carried with the proximate end of the second shaft and of lesser radius than the arms, means to connect said coupling plate to the disc, and tension cords formed within the disc and disposed in the plane of the disc and tangentially to the arc of movement of the connection between the coupling plate and disc.

3. In combination with driving and driven shafts, a disc of re-enforced fabricated material, diametrically disposed arms carried with an end of one of the shafts, bolts to connect the extremities of the arms with the disc, a coupling plate carried with the proximate end of the other shaft and of lesser radius than the arms, bolts to connect the coupling plate with the disc, and continuous tension cords formed within the disc and disposed in the plane of the disc and tangentially of the arc of movement of the point of connection between the coupling plate and disc.

This specification signed this 15th day of April, A. D. 1924.

ALFRED F. MASURY.